UNITED STATES PATENT OFFICE.

EMILE CRUMIÈRE, OF PARIS, FRANCE.

PROCESS FOR THE PRODUCTION OF CELLULOSE SOLUTIONS.

No. 908,754.      Specification of Letters Patent.      Patented Jan. 5, 1909.

Application filed October 18, 1906. Serial No. 339,459.

To all whom it may concern:

Be it known that I, EMILE CRUMIÈRE, a citizen of the Republic of France, residing in Paris, France, have invented certain new and useful Improvements in Processes for the Production of Cellulose Solutions, of which the following is a specification.

The remarkably energetic oxidizing power of ozone which is now obtainable on an industrial scale has suggested to the present applicant that cotton or cellulose that has to be dissolved in ammoniacal cupric solution might advantageously be treated with ozone in order to produce the intense oxidizing action which, as the applicant has ascertained, is favorable to the manufacture of artificial silk.

The researches which the applicant has made in the subject have shown that ozone, by virtue of the particular oxidation that it produces, brings the cotton into a condition in which it not only dissolves with advantageous rapidity in the ammoniacal cupric solution, but also yields a solution of cellulose having body, that is to say a condition essential for the production of satisfactory threads having suitable resistance. Moreover, the applicant has found that the artificial silk prepared from the solution shows a beautiful white silky appearance.

The invention relates, therefore, to the treatment of cotton or cellulose which is to be used for the manufacture of artificial silk or the like with ozone.

In applying the ozone to the cotton certain substances, among which are alkaline bodies, such as caustic soda, potash, or a mixture thereof, facilitate the penetration of the oxidizing action throughout the mass of the cotton fibers, thus producing a uniform distribution of the action.

In practice the cotton may be brought into contact with a solution of soda for example, through which is bubbled for 30 minutes or so a current of ozone or of ozonized air produced by any suitable ozonizing apparatus.

The ozonizing of cotton in the presence of an alkaline solution may be advantageously carried out in the following manner: (1) A solution of caustic soda or caustic potash (say 25 cubic centimeters of a solution of soda of 1.4 density per liter of water) to make 15 or 20 liters per kilo of cotton to be treated is prepared and into this a current of ozone is passed for some five minutes. (2) The cotton is introduced into this ozonized caustic solution and a current of ozone is passed for about thirty minutes more, the mass being stirred during the operation. (3) The current of ozone is stopped and the whole is boiled for about thirty minutes. The ozone is introduced in both cases in the form of air containing about 0.2 milligrams of ozone per liter of air. The air is introduced at approximately the rate of 72,000 liters per hour. This with the ozone content indicated would give the rate of circulation of the ozone as 14.4 grams per hour. This quantity of ozone, 14.4 grams is about the quantity which would be furnished by an electric current of 120 watts.

The cotton thus prepared is washed, dried in the air, and is then ready for the manufacture of the solution of cellulose necessary for obtaining artificial silk presenting the aforesaid advantages.

The part which the ozone plays in this process is not that of a bleaching agent decolorizing the fiber, but that of a promoter of the dissolution of the cotton in the ammoniacal cupric solution or the like to produce a liquid form which artificial silk or similar products may be made having a high degree of resistance and great elasticity.

In proportion as the ammoniacal cupric solution dissolves the cellulose, the solution becomes impoverished in copper, and in order to control the dissolving action the present invention provides for maintaining the strength of this solution in copper practically constant. For this purpose a certain quantity of free metallic copper is added to the ammoniacal cupric solution prepared in the ordinary manner.

When the cotton prepared in the manner aforesaid is introduced into this ammoniacal cupric solution, the free metallic copper dissolves in the ammonia set free by the fixation of the already dissolved copper upon and in the fibers of the cellulose in proportion as these dissolve.

The phenomena occurring in the operations described are of a physico-chemical nature, probably more physical than chemical. Thus, having knowledge of the dissolving action stated, it appears that it is not the ozone alone which acts, but there is a complex reaction resulting from the presence of ozone, alkali and cellulose, and causing nascent formations which in turn cause physico-chemical phenomena facilitating the solvent action of the ammoniacal cupric solution.

Having thus described the nature of my said invention and the best means I know of carrying the same into practical effect, I claim:—

1. The process of making a compound of cellulose adapted for the production of artificial silk, which consists in subjecting the cellulose to the action of ozone and an alkaline solution and forming a solution of the cellulose thus treated.

2. The process of making a compound of cellulose adapted for the production of artificial silk, which consists in introducing the cellulose into an alkaline solution and passing through the mixture a current of ozone, and making a solution of the cellulose thus treated.

3. The process of making a compound of cellulose adapted for the production of artificial silk, which consists in subjecting the cellulose to the action of ozone and an alkaline solution, and dissolving the cellulose thus treated in cupro-ammoniacal liquor.

In witness whereof I have hereunto signed my name this 5th day of October 1906, in the presence of two subscribing witnesses.

EMILE CRUMIÈRE.

Witnesses:
  HANSON C. COXE.
  GARBRIEL BELLIARD.